United States Patent [19]

Valyi

[11] 4,151,248
[45] Apr. 24, 1979

[54] METHOD FOR THE PREPARATION OF HOLLOW PLASTIC ARTICLES

[76] Inventor: Emery I. Valyi, 5200 Sycamore Ave., Riverdale, N.Y. 10471

[21] Appl. No.: 843,718

[22] Filed: Oct. 20, 1977

Related U.S. Application Data

[63] Continuation of Ser. No. 618,782, Oct. 2, 1975, abandoned, which is a continuation-in-part of Ser. No. 473,580, May 24, 1974, Pat. No. 3,966,378.

[51] Int. Cl.² .............................................. B29C 17/07
[52] U.S. Cl. .................................... 264/513; 264/530;
264/532; 264/537
[58] Field of Search ........................ 264/89, 90, 92, 94,
264/97, 98, 99, 296; 425/523, 526, 530, 533, 534

[56] References Cited

U.S. PATENT DOCUMENTS

| 2,331,702 | 10/1943 | Kopitke | 264/97 |
| 3,412,186 | 11/1968 | Piotrowski | 264/97 X |
| 3,767,747 | 10/1973 | Uhlig | 264/98 X |
| 3,776,991 | 12/1973 | Marcus | 264/89 |
| 3,882,213 | 5/1975 | Uhlig | 264/97 |
| 3,944,643 | 3/1976 | Sato et al. | 264/97 |
| 3,963,399 | 6/1976 | Zavasnik | 425/526 |
| 4,036,927 | 7/1977 | Stolki | 264/97 |

Primary Examiner—Jan H. Silbaugh
Attorney, Agent, or Firm—Bachman and LaPointe

[57] ABSTRACT

Method and apparatus for the preparation of hollow plastic articles wherein improved temperature control of the parison is obtained by altering the heat content of a parison by a first, temperature controlled mold and core, transferring the parison to a second, temperature controlled mold, and substantially equalizing the temperature distribution of the parison by heat exchange with the second mold.

21 Claims, 5 Drawing Figures

METHOD FOR THE PREPARATION OF HOLLOW PLASTIC ARTICLES

CROSS-REFERENCE TO RELATED APPLICATIONS

This application is a continuation of Ser. No. 618,782, filed Oct. 2, 1975 now abandoned, which in turn is a continuation-in-part of copending application Ser. No. 473,580, filed May 24, 1974 by Emery I. Valyi, for METHOD AND APPARATUS FOR MAKING ORIENTED HOLLOW PLASTIC ARTICLES, now U.S. Pat. No. 3,966,378.

BACKGROUND OF THE INVENTION

This invention relates to the art of blow molding articles of organic plastic material from a parison and has for its principal object the improved, substantially uniform adjustment of the temperature of the parison, the provision of improved, oriented hollow articles and a method and apparatus for obtaining same.

The art teaches various methods and apparatus for obtaining blow molded articles of organic plastic material from a parison, such as in U.S. Pat. No. 3,349,155 and U.S. Pat. No. Re. 27,104. Generally these methods are characterized by forming a parison in a parison mold on a blow core, placing said formed parison and blow core into a blow mold and expanding said parison in the blow mold by means of fluid pressure.

While the blow molding operation tends to impart orientation to the article, the degree of such orientation is difficult to control and therefore it is difficult to obtain the advantageous properties in the article that orientation is capable of providing if said orientation is carried out under the most desirable conditions.

It is known that the control of orientation depends largely upon the control of the temperature of the parison just prior to orientation. It is found that such temperature control is best obtained by enclosing the article prior to the orienting step in a mold whose surfaces provide conductive contact with the corresponding surfaces of the article.

SUMMARY OF THE INVENTION

In accordance with the present invention, a method is provided for the preparation of hollow articles maintaining substantially consistent temperature control of the articles prior to orientation or prior to final expansion. The process of the present invention comprises: providing an organic plastic parison on a temperature controlled first core in a temperature controlled first mold; comparatively rapidly altering the heat content of said parison by means of said first core and first mold with an unequal distribution of heat resulting in said parison; transferring said parison from said first core and first mold to a temperature controlled second mold and preferably also a temperature controlled second core; and substantially equalizing the temperature distribution of said parison by heat exchange with said second mold and second core if present.

In accordance with the present invention the parison may be pre-expanded prior to the final expansion step to an intermediate shape in a pre-forming mold (e.g., the second mold) so as to establish intimate surface contact between said pre-forming mold and the pre-expanded parison, said shape being chosen whenever possible so as to permit the insertion therein of a mandrel or core into intimate surface contact with the inside of said parison. The pre-expanded parison is therefore in full surface contact with the pre-forming mold and preferably also the mandrel, the temperature of both being controlled so that thereby the temperature of the pre-blown parison may be correspondingly controlled and efficiently adjusted to that resulting in optimum conditions for orientation.

In accordance with the present invention, therefore, a method is also provided for the preparation of oriented hollow articles maintaining substantially uniform temperature control of the articles prior to orientation which comprises providing a parison on a first core in a formable condition, locating said first core bearing said parison in a temperature controlled pre-forming mold, pre-forming said parison within said pre-forming mold into a shape capable of receiving thereinto a core seated with substantially full surface contact therewith and to separate said parison from said first core and to bring the outer wall of said parison into efficient heat exchange relationship with said pre-forming mold, retaining said pre-formed parison within said pre-forming mold while separating said first core and said pre-forming mold from each other, aligning said pre-forming mold containing said pre-formed parison preferably with a temperature controlled second core having an external configuration shaped to conform to the internal configuration of said pre-formed parison, inserting said second core if used in said pre-formed parison contained within said pre-forming mold so as to substantially uniformly adjust the temperature distribution thereof, transferring said pre-formed parison to a blow mold and fully expanding the pre-formed parison in said blow mold. If a multi-oriented article is desired as aforesaid, the pre-formed parison may be axially stretched, as in the blow mold, prior to fully expanding same.

If it is desired to produce a multi-layered parison and a multi-layered final article, the first core may be provided with a layer of one plastic and a subsequent layer may then be pressure molded therearound in accordance with my U.S. Pat. Nos. 3,349,155, 3,717,544 and 3,719,735. It should be understood, therefore, that where the general description that follows refers simply to parisons, the method and apparatus of the present invention are applicable to multi-layered as well as single-layered parisons.

The apparatus of the present invention comprises a first core and a first mold, means for providing a parison on said first core in said first mold, means for altering the heat content of said parison on said first core in said first mold under conditions that are apt to provide an unequal distribution of heat in said parison, a second mold and preferably also a second core in spaced relationship to said first mold and first core, means for transferring said parison from said first mold to said second mold and from said first core to said second core if a second core is used, and means for controlling the temperature of said parison in said second mold to substantially equalize the temperature distribution of said parison.

In a further embodiment the apparatus of the present invention also comprises a first core, means for providing an organic plastic parison thereon, a temperature controlled pre-forming mold for partially forming said parison located on said first core, means for partially forming said parison located on said first core in said pre-forming mold, means for separating said first core and said pre-forming mold and partially formed parison contained therein, a temperature controlled second core in spaced relationship to said first core having an external configuration shaped to conform to the internal configuration of said partially formed parison, means for inserting said second core into said partially formed parison contained in said pre-forming mold so as to substantially uniformly adjust the temperature thereof, a blow mold in spaced relationship to said pre-forming mold, means for transferring said partially formed parison to said blow mold and means for fully expanding the partially formed parison in said blow mold.

It can be seen that the process and apparatus of the present invention readily obtains uniform temperature control of the inside and outside surfaces of the parison so that the resultant article is characterized by highly improved properties. Thus, one may conveniently obtain articles that are multi-axially oriented under conditions of close control. It is known that orientation substantially improves the significant properties of plastics, as clarity, impact resistance, strength, resistance to permeation, etc. Among the plastics that can be so improved are polystyrene, polyvinyl chloride, polyolefins, as polyethylene and polypropylene, polyesters, polyamides, acrylics, acrylonitrile, and methacrylonitrile polymers. The improved temperature control of the present invention enables one to obtain improved properties and controlled multi-axial orientation in a simple and expeditious manner.

Accordingly, it is a principal object of the present invention to provide a method and apparatus for the preparation of hollow articles from moldable organic plastic material which enables accurate temperature control.

It is a further object of the present invention to conveniently and expeditiously provide improved articles which are multi-axially oriented under conditions of close control.

It is a still further object of the present invention to provide a method and apparatus as aforesaid which provides products possessing reproducibly uniform properties due to orientation.

Other objects and advantages of the present invention will be apparent to those skilled in the art from the description which follows with reference to the accompanying drawings.

DETAILED DESCRIPTION OF THE PREFERRED EMBODIMENTS

Figure 1:
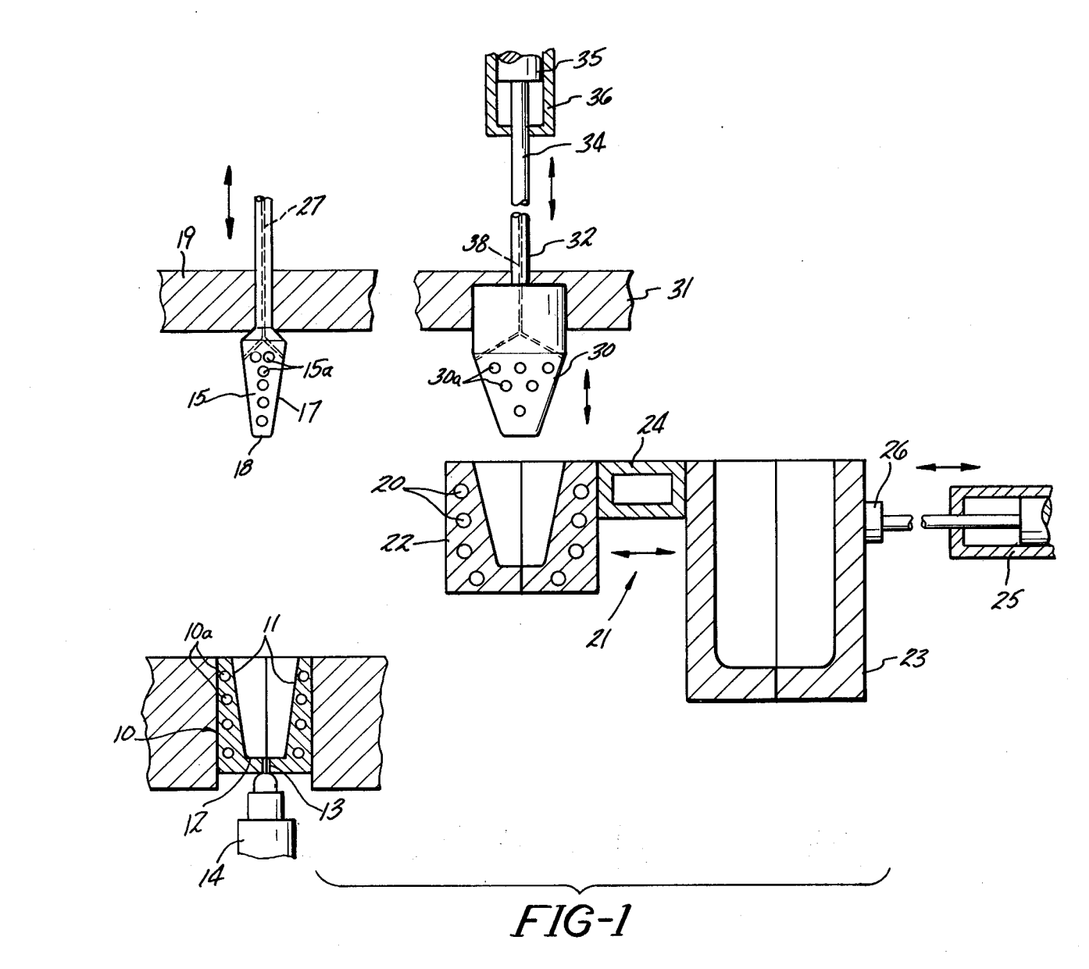
FIG. 1 is an elevation, partly in section, illustrating the method and apparatus of the present invention.
Figure 2:
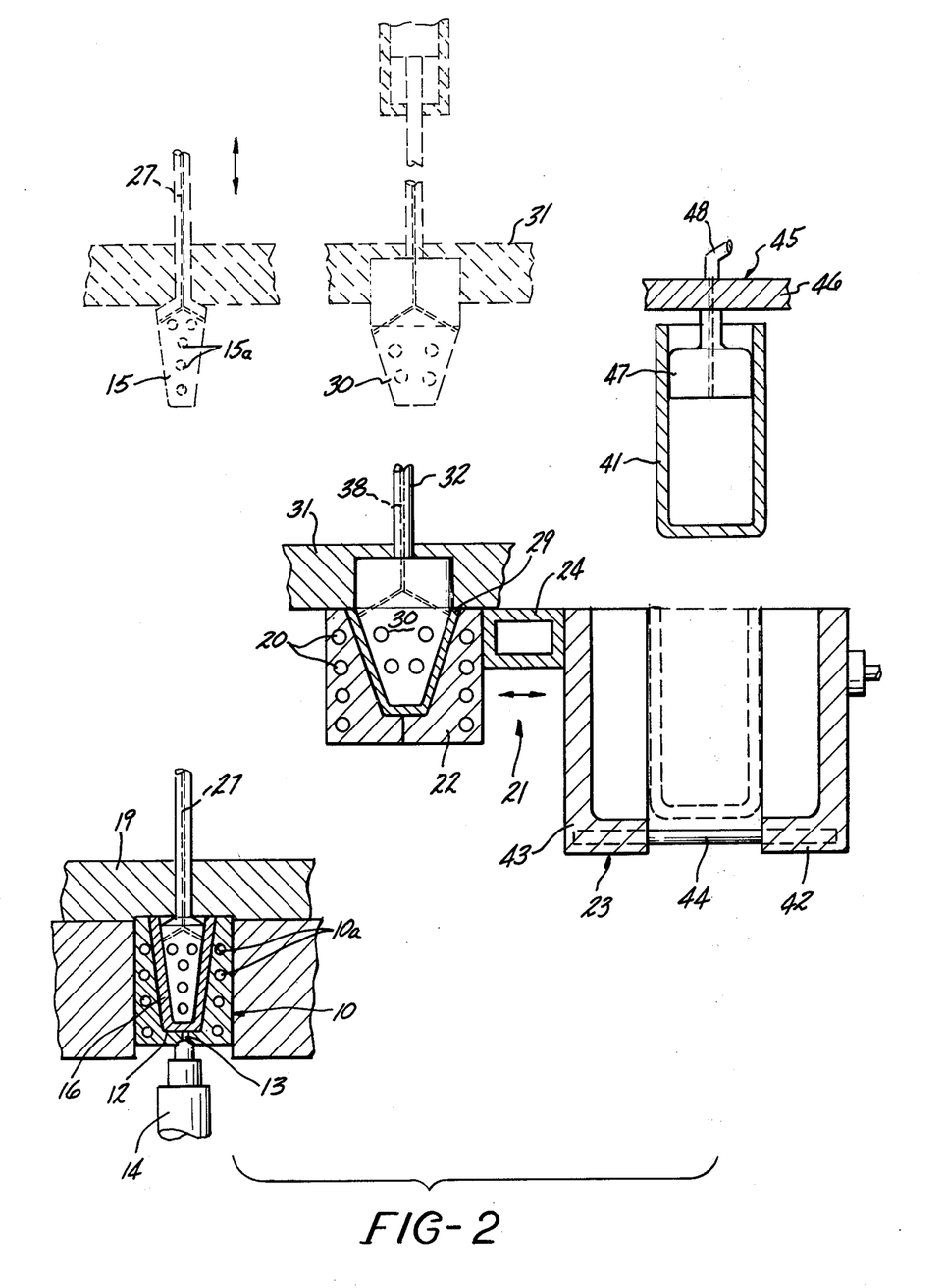
FIGS. 2 and 3 are views similar to FIG. 1 with additional portions in phantom showing a sequence of operations according to an embodiment of the present invention.
Figure 3:
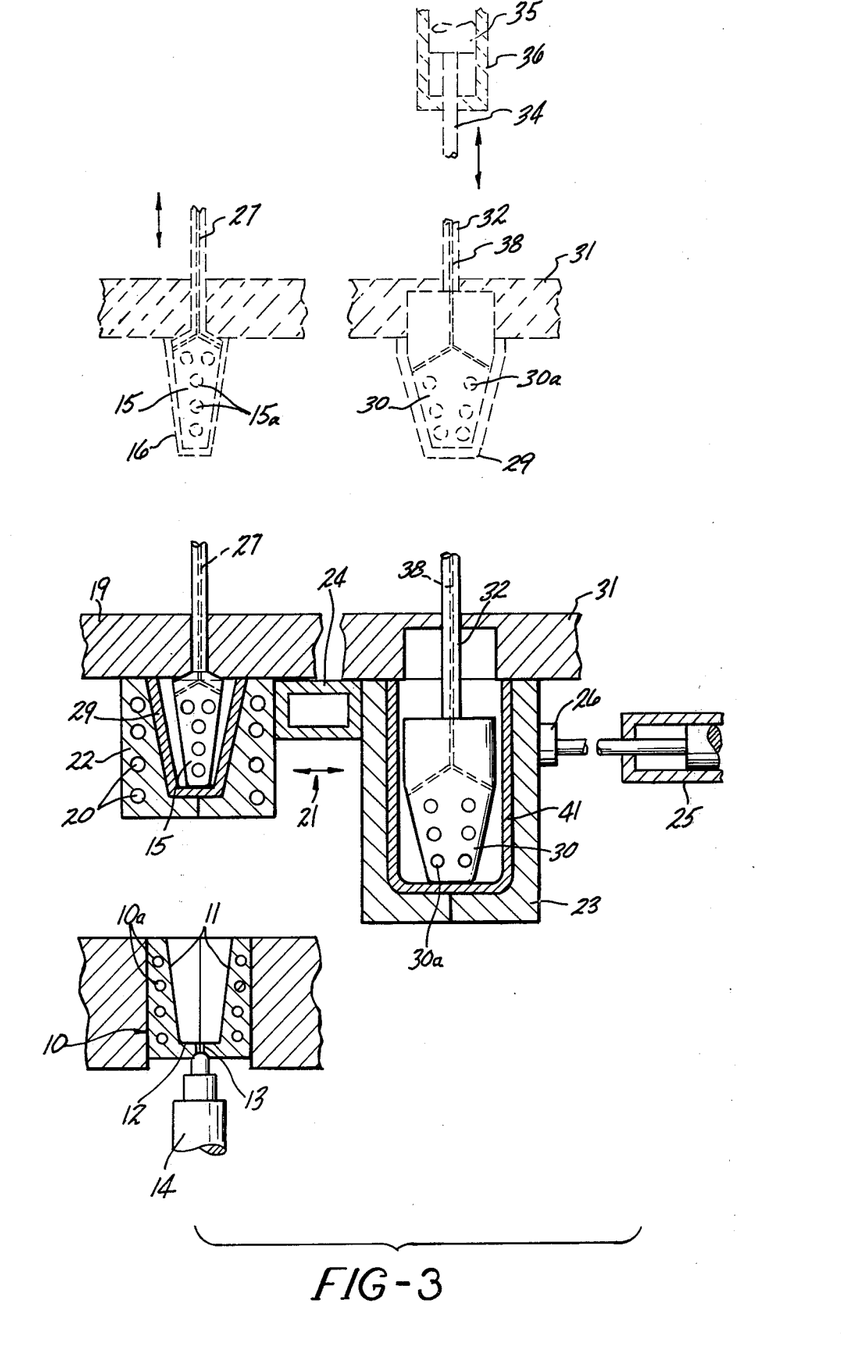

Referring to the drawings in more detail, FIGS. 1, 2 and 3 illustrate a method and apparatus in accordance with one embodiment of the present invention. In this embodiment, the parison is provided by an injection molding process; however, the invention is not limited thereto and includes other known molding processes that are capable of producing parisons such as compression molding, casting, extrusion with or without secondary operation, and the like. FIG. 1 depicts a parison die 10, having outer walls 11 which may be separable, depending upon the shape of the parison and which are adapted to form the outer surface of the parison, and having an end wall 12 shaped to form the end wall of the parison. The parison die 10 is desirably temperature controlled, such as by heating or cooling elements 10a contained therein which are connected to an appropriate heat transfer source (not shown). The end wall 12 of the parison die has an injection opening 13 registering with an injection nozzle 14 through which the organic plastic material is injected into the parison die. The parison die 10 is shown as split for convenience in opening to release the formed parison; however, it should be understood that the invention is not limited thereto, as one-piece dies having suitable release mechanisms known in the art are encompassed herein.

As indicated hereinabove, the plastics contemplated in accordance with the present invention are the moldable organic plastic materials and preferably those whose properties are improved by orientation, such as the polyolefins, polyethylene, polypropylene and copolymers thereof, polyvinyl chloride, polystyrene, acrylonitrile, methacrylonitrile, polyvinylidene chloride, polycarbonates, polyesters, polyamides, etc.

The formation of the parison in accordance with the embodiment illustrated in FIGS. 1, 2 and 3 takes place after a first core 15 (which may be a blow core) illustrated in FIG. 1, and set forth in phantom in FIGS. 2–3, and die 10 are brought into engagement. Upon completion of injection through nozzle 14, a parison 16, having substantially the configuration represented in FIG. 2, is formed.

Core 15 provides a side wall 17 and an end 18 for the formation with walls 11 and 12 of parison die 10, of a die cavity in which the parison is formed. Core 15 is desirably temperature controlled, such as by heating or cooling elements 15a contained therein which are connected to an appropriate heat transfer source (not shown). Core 15 is carried by platen 19 which, as shown in FIG. 2, engages parison die 10 at a point opposed to injection opening 13 to form the upper surface of the parison die cavity. If desired, this assembly may further include a neck mold (not shown) for engagement with the parison while the latter is on blow core 15 after disengagement from parison die 10, which neck mold may possess threads for defining a threaded opening in the final molded object.

Upon separation of the parison die 10 and the core 15 bearing parison 16, retained thereon by means of suction applied through passageway 27, if necessary, the latter assumes the position depicted in FIG. 1 and shown in phantom in FIG. 3. Mold assembly 21, which comprises a mold 22 which operates as a tempering mold and which may be shaped as a pre-forming mold or pre-blow mold and second blow mold or finish mold 23, and blow core 15 are brought into alignment so as to juxtapose mold 22 and parison 16, illustrated, as noted earlier, in phantom in FIG. 3. Mold 22 and mold 23 are maintained in integral spaced relationship by connecting member 24, and are arranged for common reciprocation, for example, by means of hydraulic cylinder 25 which is illustrated in FIG. 1 as connected to mold 23 by the attachment labeled 26 thereon. The assembly may be supported for traverse between the positions suggested in FIGS. 2 and 3, respectively, by conventional means, such as tie bars or rails, not shown herein.

Assembly 21, as described above, is merely illustrative of one embodiment of this invention and is capable of modifications in design and operation, as illustrated in applications Ser. No. 473,580 filed may 28, 1974 and Ser. No. 479,287 filed June 14, 1974 now U.S. Pat. Nos. 3,966,378 and 3,970,419 respectively.

Referring now to FIG. 3, upon the alignment of mold 22 and core 15 bearing parison 16, as noted earler, core 15 and parison 16 are then placed within mold 22, for example, in the manner indicated in the figure. Other means of engaging parisons and blow molds may be used and are well known, such as those disclosed in U.S. Pat. Nos. 2,853,736 and 2,974,362. The parison is then partially expanded into mold 22, whose temperature is controlled by heating or cooling coils 20 connected to an appropriate heat transfer source (not shown) to optimize the parison temperature for subsequent operations in a manner to be described below. Naturally any suitable heating or cooling means may be used in any of the heating or cooling coils described herein, such as a passage containing heat transfer fluid maintained at a suitable temperature. Also, the parison is thereby freed from core 15. As is illustrated in the figures, expansion is conventionally achieved by the provision of fluid under pressure through passage 27 provided within blow core 15 for that purpose. FIG. 3 illustrates the extent of expansion, as the perimeter of the unexpanded parison 16 is represented in phantom and the pre-expanded or pre-formed parison resulting from the exertion of fluid pressure is labeled 29. The shape of pre-formed parison 29, as determined by the mold cavity in pre-blow mold 22, may be such that a suitably shaped solid object, e.g., a second blow core, may be inserted into substantially complete surface contact therein. In such an instance, the said shape should exhibit no undercuts or reverse curves on the inside surface, but should exhibit an inward taper over most of its inside surface. It is preferable to have a pre-formed parison shape that permits a second core to be inserted therein into substantially complete internal surface contact therewith. However, the parison shape does not always permit this, as for example, it may not be possible to make a pre-formed parison shape of this configuration for a long, narrow bottle.

After completion of the partial expansion, or pre-expansion of the parison, mold 22 and blow core 15 are separated, and parison 29 is retained by pre-forming mold 22. Blow core 15 is then returned to the starting position as illustrated in FIG. 1, and mold assembly 21 including mold 22 containing parison 29 is shifted laterally into the position illustrated in FIGS. 1 and 2.

Parison 29, which is retained within mold 22, is transferred into alignment with a second core 30 which is provided with temperature control means, such as coils 30a connected to an appropriate power source (not shown), and has an external configuration shaped to conform to the internal configuration of the pre-formed parison 29. Naturally, any suitable temperature control means may be used. In addition, core 30 may, if desired, include a transfer, stretch and blow assembly which comprises a mandrel extension 32 which is reciprocable together with core 30 as indicated by the arrow in FIG. 1 to axially extend the parison 29. An actuating means is shown which comprises a push rod 34 which engages mandrel 32, and which is connected to a piston 35 housed within a cylinder 36 which may, for example, be responsive to hydraulic pressure exerted by a pump, not shown. Such actuating means is merely illustrative of one manner of operation, as other actuating means known in the art can be employed herein. If a highly oriented article is not desired, the axial extension operation may be dispensed with.

For the final forming sequence, the parison is separated from mold 22 by retaining it on core 30, such as by means of suction applied through passageway 38 if necessary. Cores 15 and 30 are situated in the same spaced relationship as exists between molds 22 and 23, to enable both cores to engage a respective mold when core 15 is aligned with mold 22. This facilitates the concurrent pursuit of both the pre-forming and final forming processes with separate parisons. Further, and with regard to the transfer of parison 29 to core 30, it should be noted that parison die 10 is spaced from mold 22, as illustrated in FIGS. 1 and 2, so that core 15 may engage with die 10 to form another parison while core 30 engages with mold 22. The ability to concurrently conduct the various operations of the process outlined herein comprises one of the notable advantages of the invention. The simultaneous formation, pre-expansion, or final expansion and finished article removal of a plurality of parts is envisioned, as the apparatus illustrated in the accompanying figures can be further modified to provide additional intermediate molds and cores, such as mold 22 and core 30. If a large volume operation is desired, then a multiplicity of mold cavities and cores will be employed at each operating station, as is customary in the art.

As is stated above, parison 29 is transferred to core 30 for further processing. Core 30 is carried by platen 31 which, as shown in FIG. 2, engages mold 22 in the same manner as platen 19 engages parison mold 10.

A fluid passageway 38 is provided and extends radially, usually at the end surface of the core 30 that is attached to mandrel 32, in the manner known in the art for the construction of blow cores. Fluid passageway 38 also connects to a source of fluid under pressure, not shown. Accordingly, fluid may enter the space inside parison 29 during final expansion, discussed hereinafter.

Thus it can be seen that when heated or cooled core 30 engages heated or cooled mold 22 containing parison 29 therein (FIG. 2), the temperature of parison 29 is adjusted efficiently i.e., the temperature distribution within the walls thereof, due to heat exchange between both the inner and outer surfaces of the parison and the corresponding mold and core surfaces. Thus, the parison is rapidly and uniformly prepared for further processing, such as axial extension and final expansion. This is a considerable advantage since it avoids the problem of parison cooling during a multi-step process and improves the heat transfer conditions that exist if only the outer surface of the parison is in heat transfer relation with a corresponding mold element customary heretofore. Naturally, conventional temperature regulators are used to control the heating means of core 30 and mold 22 individually.

It is particularly advantageous in accordance with the present invention to first rapidly (e.g., less than about 12 seconds) alter the heat content of parison 16 by heat exchange with core 15 and mold 10 under conditions that necessarily result in an unequal distribution of temperature in said parison, followed by substantially equalizing the temperature distribution in said parison by heat exchange with core 30 and mold 22. Thus, for example, one can form parison 16 by injection molding, rapidly cool said parison by heat exchange with core 15 and mold 10 which will result in said unequal temperature distribution, and further cool said parison by heat exchange with core 30 (which need not necessarily have a configuration shaped to conform to the parison) and mold 22 to substantially equalize the temperature distribution of said parison, all in a controlled manner. Alternatively, in accordance with the present invention, a pre-formed parison may be placed in mold 10, heated in mold 10 by heat exchange with mold 10 and core 15 to provide said unequal temperature distribution, and further heated in mold 22 by heat exchange with mold 22 and core 30 to substantially equalize the temperature distribution of said parison. The foregoing provides the considerable advantages of enabling the attainment of substantially uniform temperature of the parison resulting in optimum conditions for orientation without excessive dwell time in the mold. The first mold is freed for further use while the pre-forming mold is completing the conditioning of the parison, resulting in an expeditious processing cycle.

Referring to FIG. 2, the transfer of parison 29 to finish mold 23 is conducted by core 30 which is in engagement with mold 22 and parison 29. To facilitate the removal of the parison from mold 22, suction may be applied through fluid passageway 38 in order to hold the parison on core 30 as indicated above. Core 30 with the parison thereon is then separated from mold 22, which may be split to release parison 29. Upon release, core 30 with parison 29 thereon returns to the position illustrated in FIG. 1 and depicted in phantom in FIG. 3.

Upon completion of the above transfer, mold assembly 21 is laterally shifted so as to juxtapose finish mold 23 and core 30 while at the same time aligning mold 22 and core 15, as described earlier and depicted in FIG. 3. The cores are then received within the respective molds, with the temperature of parison 29 having been adjusted as described above, and parison 29 is axially extended into the finish mold 23 by the advancement of mandrel 32 by means of push rod 34. As shown in FIG. 3, platen 31 engages the open portion of finish mold 23 to form a closed finish mold cavity. Therefore, the present invention may conveniently stretch the parison longitudinally before final blowing and thereby produces orientation in the axial direction as well as the orientation subsequently produced by blowing. It can be seen that the temperature of the parison, in its original and pre-blown states may be properly and conveniently controlled by contact with the respective molds and cores.

After the completion of axial extension, the parison is fully expanded to conform to the configuration of finish mold 23 to form the final object 41 which, in the embodiment illustrated herein, is an open-ended container. Full expansion is accomplished by supplying fluid under pressure through passageway 38 into the interior of axially extended parison 29.

After full expansion is completed, core 30 and finish mold 23 containing final object 41 are separated in the same fashion described earlier with reference to core 15 and mold 22, and core 30 is positioned as shown in phantom, in FIG. 2. Referring further to FIG. 2, mold assembly 21 is shifted laterally, and finish mold 23 is positioned for removal of final object 41, which is then cooled sufficiently for that purpose.

Removal may be conducted in various ways depending upon the configuration of the finish mold as disclosed in the aforementioned U.S. patent applications Ser. No. 473,580 and Ser. No. 479,287. In the embodiment illustrated herein, finish mold 23 is longitudinally split into two sections labeled 42 and 43, which may reciprocate in and out of communication along connecting means 44, by an actuating means, not shown, such as, for example, a hydraulic cylinder. Thus, in FIG. 2, sections 42 and 43 are parted an amount sufficient to permit the escape of object 41 as illustrated in phantom, and object 41 is then easily removed and may, for example, be placed on a carrier assembly 45, comprising a platform 46 which supports an appropriately dimensioned transfer finger 47 connected to a source of fluid by line 48, which is placed into the opening located in the neck of object 41, such as that which is disclosed in my U.S. Pat. No. 3,587,133.

Though a method and apparatus have been described above with reference to the preparation of single-layered parisons by injection or other molding process in a parison die, and exposing said parisons immediately to the further steps of the present invention, a wide variety of modifications may be employed within the scope of this invention.

Figure 4:
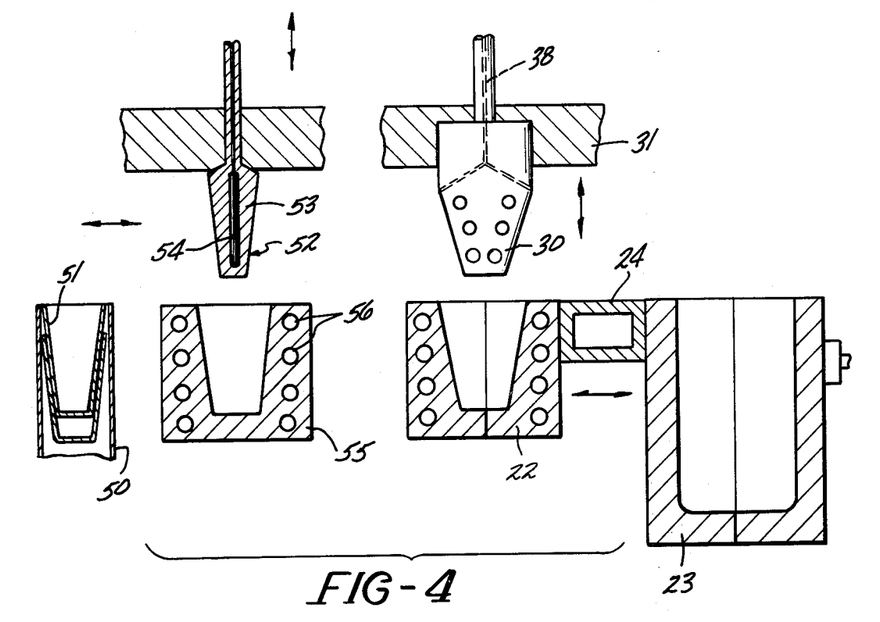
FIG. 4 is an elevated view, partly in section, illustrating an alternate method and apparatus for providing a parison according to the present invention.

In one modification, the parison may be formed earlier at a time and location of its own, and stored before being formed into the final article. In addition to injection molding, numerous methods are known that may be employed to provide thermoplastics in the shape of a parison, such as tube extrusion with welding of one open end, dipping, deposition, thermoforming and the like. Thus, the previously formed parison may be transported to and placed upon a first blow core which cooperates with a heating means to raise the temperature of the parison sufficiently to enable it to undergo deformation. An apparatus of this type is shown in FIG. 4 wherein dispenser 50 contains a quantity of previously formed parisons 51 which are singly released upon engagement with core member 52. Core member 52 substantially resembles blow core 15 of FIG. 1, with the feature that mandrel 53 contains heating means 54 which may be an electric cartridge heater or a passage containing heated fluid maintained at an elevated temperature by external heating means, not shown.

In addition to heated core member 52, a heating mold 55 may be employed to heat the outer surface of the parison when in engagement therewith. Mold 55 is located in the same horizontal plane occupied by dispenser 50 and in spaced relative thereto, and, incidentally retains the same position occupied by parison die 10 in FIG. 1. Core member 52 is adopted to reciprocate laterally as well as axially, so as to alternately align with both structures. Heating mold 55, like core member 52, may possess electric or fluid heaters 56 suitably placed to heat its inner walls for transmitting heat to a parison placed into contact therewith. Conventional temperature regulators are used to control the heating means of core 52 and mold 55 individually. Core member 52 and heating mold 55 may be held together with enough pressure to assure that the parison is uniformly brought to temperature for subsequent deformation in the same manner as in FIGS. 1-3. The processing cycle is then completed as in the previous embodiment.

Figure 5:
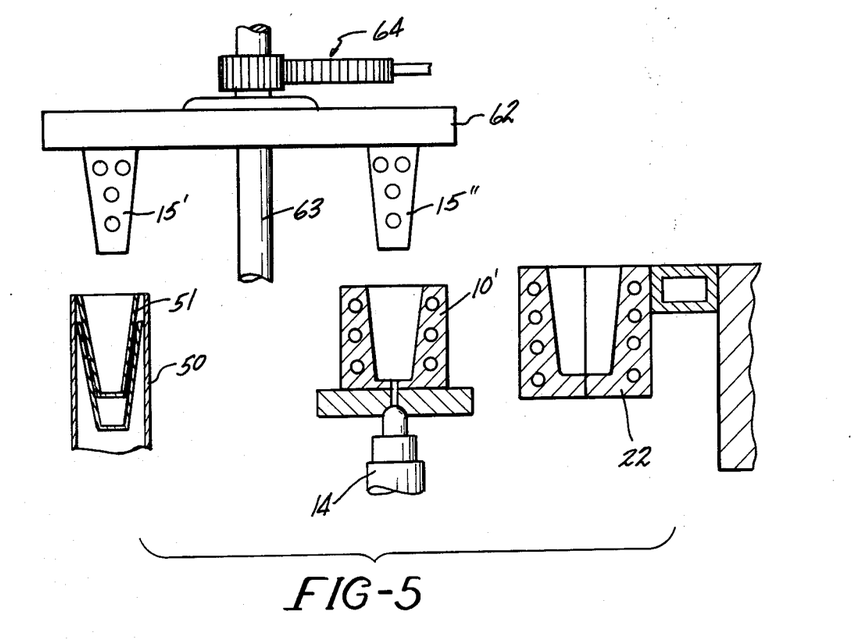
FIG. 5 is a view similar to FIG. 1 which shows an apparatus and method for the preparation of lined and composite parisons.

As noted earlier, the method and apparatus of the present invention are readily adapted for the preparation of composite and lined hollow articles as, for example, described in my U.S. Pat. No. 3,737,259. In the embodiment shown in FIG. 5 dispenser 50 is shown in horizontal alignment with a parison die 10' and both are in vertical alignment with platform 62 carrying diametrically opposed blow cores 15' and 15", respectively, in all respects structurally conforming to first blow core 15 in FIG. 1. Platform 62 is adapted to reciprocate cores 15' and 15" into and out of engagement with dispenser 50 and die 10' on vertical rod 63, and is rotatably reciprocable by an actuating means, not shown, which cooperates with rack-and-pinion linkage 64. Thus, in operation, platform 62 is raised to simultaneously engage dispenser 50 and die 10', and core 15' receives a pre-form 51' which may be held thereon by suction and which may be either a parison or a liner. Platform 62 is then lowered and, after transfer of the hot parison to pre-forming mold 22, it is rotated 180°. Core 15' carrying a liner or pre-form 51' is thus brought into engagement with die 10'. If pre-form 51' is a liner, injection therearound of a subsequent layer takes place next. If pre-form 51' is a parison, die 10' serves merely to heat same to forming temperature as in FIG. 4. As shown in FIG. 5, platform 62 and die 10' are spatially disposed to facilitate transfer of the composite or lined parison from core 15' to mold 22 in accordance with the embodiment illustrated in FIGS. 1-3. The details of this apparatus are disclosed in my U.S. Pat. No. 3,737,259, issued June 5, 1973, and are incorporated herein by reference. Naturally other methods may be chosen for applying the liner, as for example, that shown in FIG. 4 of the aforesaid U.S. Pat. No. 3,737,259.

It is understood that whenever previously produced parisons are employed, as for example in the embodiment according to FIG. 4, such parisons may be provided with an inside coating or liner and, as much, may be multi-layered.

It is noted that the methods that are within the capabilities of the several embodiments of apparatus described herein involve the control of the parison temperature prior to orientation in such a manner that the following steps are accomplished: the parison, whether directly molded or previously made, must have its heat content changed rapidly for the best operating cycles; and also its temperature adjusted uniformly for best control of orientation.

Heat flow from or into the parison is the greater the more the temperature of the parison surfaces and those of the mold component surfaces in contact therewith differ. Hence, in order to rapidly remove the amount of heat from a freshly molded parison, or to add the amount of heat to a previously made parison, to the extent corresponding to the average temperature desired for orientation, relatively great differences must be maintained for the requisite times between the parison walls and the mold component walls. While this results in efficient heat flow, the temperature distribution within the parison wall becomes very poor, the skin of the parison being substantially hotter or cooler than the inside regions thereof, with the major portions of the parison being at the wrong temperature for orientation.

It is therefore the function of the mold 22, whenever possible in combination with core 30, to retain the parison in an environment efficiently suitable for equalizing the distribution of the temperature within the walls of the parison. Accordingly, an efficient and accurately controllable sequence of heat transfer operations is provided by the present invention, wherein one mold and core set is used for rapid change of the heat content of the parison and another set for the adjustment of the temperature distribution in the walls thereof.

For example, computations shown that a polypropylene article may be injection molded in accordance with FIGS. 1, 2 and 3 at a temperature of about 216° C. with mold 10 maintained at about 25° C. and core 15 maintained at about 45° C. For optimum orientation conditions one prefers a substantially uniform temperature of about 165° C. which may be conventionally obtained by the expensive and time consuming procedure of slowly heating a previously formed parison in an oven. After 5 seconds residence time, the average parison temperature becomes 159° C., with the lowest parison temperature adjacent the mold being about 52° C., the parison temperature adjacent the core being about 70° C., and the parison temperature in the center being about 210° C.

With a transfer time to mold 22 of about 2 seconds, the average temperature of the parison becomes about 156° C., outside parison temperature about 86° C., inside parison temperature about 69° C. and center parison temperature about 207° C., core 30 and mold 22 being maintained at a temperature of about 165° C. after a 5 second residence time in mold 22 in contact with mold 22 and core 30, a substantially uniform parison temperature may be obtained with an average parison temperature of about 167° C., whereby the outside parison temperature is about 162° C., inside parison temperature about 160° C., and the center parison temperature about 182° C. This will result in excellent properties in the final oriented product. Note that the residence time in mold 22 is chosen to correspond to the residence time in the parison mold.

In order to adjust the temperature to more nearly approach optimum orientation conditions, the temperature of mold 10 may be maintained at about 25° C. and the core 15 raised to 65° C., with the remainder of the cycle unchanged. The resultant average parison temperature after a 5 second residence time in mold 22 is then 165° C.

Thus, it can be seen that mold 10 and core 15 rapidly alter the heat content of the parison to the extent substantially corresponding to the average temperature desired for orientation, with an unequal distribution of temperature resulting in said parison. Mold 22 and core 30 substantially equalize the distribution of the temperature within the walls of the parison while maintaining substantially the same average temperature desired for orientation. Naturally, therefore, the equalization of temperature distribution in mold 22 occurs without substantially altering the heat content of the parison since one desires in mold 22 to achieve substantially the same average temperature that is achieved in mold 10, namely, the desired orientation temperature, but with substantially equalized temperature distribution.

The versatility of the present invention can be readily appreciated from the foregoing examples. A short operating cycle is obtained together with the ability to adjust temperature to approach optimum orientation conditions.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for the preparation of oriented hollow articles of moldable organic plastic material which comprises: providing an organic plastic parison in a formable condition at a temperature substantially above that required for orientation of said plastic on a temperature controlled first core in a temperature controlled first mold, said first core and first mold being held at temperatures substantially below that required for orientation of said plastic; altering the heat content of said parison by means of heat exchange with said first core and first mold to result substantially in the heat content of said parison having an average temperature suited for orientation, wherein said alterning is effected at temperature gradients adapted for rapid heat flow, with an unequal distribution of temperature resulting across the walls of said parison; providing a first means to retain the parison in a closed environment efficiently suitable for equalizing the temperature distribution within the walls of the parison to attain a temperature substantially corresponding to the orientation temperature of said plastic; providing a second means capable of influencing the inside temperature of said parison; transferring said parison from said first core and first mold to said second means and first means; maintaining said parison on said second means in said first means without substantially altering the heat content of said parison for a time sufficient for the portions of said parison previously in contact with said first core and first mold to substantially reach the orientation temperature of said plastic and to substantially equalize the temperature distribution of said parison; transferring said parison to a blow mold; and fully expanding the parison in said blow mold.

2. A method according to claim 1 wherein said first means is a second mold and wherein said second means is a temperature controlled second core, wherein said parison is transferred from said first mold and first core to said second mold and second core, and wherein the temperature distribution of said parison is substantially equalized by heat exchange with said second mold and second core.

3. A method according to claim 2 wherein said second core is placed into internal surface contact with said parison while said parison is in said second mold.

4. A method according to claim 2 wherein said parison is retained on said first core while transferred from said first mold to said second mold, pre-formed within said second mold to separate said parison from said first core and conform said parison to the shape of said second mold, and retained within said second mold while removing said first core therefrom.

5. A method according to claim 4 wherein said pre-formed, substantially temperature equalized parison is transferred from said second mold to a blow mold and fully expanded therein.

6. A method according to claim 5 wherein said second core is a blow core which fully expands the pre-formed parison in said blow mold.

7. A method according to claim 5 including the step of axially extending said pre-formed parison prior to said fully expanding step so as to provide a final hollow article which is multi-axially oriented.

8. A method according to claim 5 wherein said second mold and said blow mold are maintained in integral spaced relationship and are arranged for common reciprocation.

9. A method according to claim 5 including the step of removing said fully expanded article from said blow mold by a carrier assembly.

10. A method according to claim 1 wherein a parison is injection molded in said first mold and is cooled by heat exchange with said first mold and first core.

11. A method according to claim 1 wherein said parison is multilayered.

12. A method according to claim 1 wherein the heat content of the parison is altered by removal of heat from the parison by means of heat exchange with said first core and first mold.

13. A method according to claim 1 including the step of axially extending said parison prior to said fully expanding step so as to provide a final hollow article which is multi-axially oriented.

14. A method for the preparation of hollow articles of moldable organic plastic material which comprises: providing an organic plastic parison in a formable condition on a temperature controlled first core in a temperature controlled first mold; altering the heat content of said parison by means of heat exchange with said first core and first mold to result substantially in the heat content of said parison having an average temperature suited for orientation, wherein said altering is effected at temperature gradients adapted for rapid heat flow, with an unequal distribution of temperature resulting across the walls of said parison; locating said first core bearing said parison in a temperature controlled second mold; pre-forming said parison within said second mold to separate said parison from said first core and conform said parison to the shape of said second mold and to have an inside configuration shaped to permit insertion of a second core therein in substantially full contact therewith; retaining said pre-formed parison within said second mold while separating said first core and second mold from each other; providing a temperature controlled second core having an external configuration shaped to conform to the internal configuration of said pre-formed parison; inserting said second core in said pre-formed parison contained within said second mold; substantially equalizing the temperature distribution of said parison that has been brought about by said temperature gradients by heat exchange with said second mold and second core; transferring said parison to a blow mold; and fully expanding the parison in said blow mold.

15. A method according to claim 14 wherein said second core is a blow core which fully expands the pre-formed parison in said blow mold.

16. A method according to claim 14 including the step of axially extending said pre-formed parison prior to said fully expanding step so as to provide a final hollow article which is multi-axially oriented.

17. A method according to claim 14 wherein said parison is multilayered.

18. A method according to claim 14 including the steps of providing a pre-formed parison on said first core and heating said pre-formed parison to provide same in a formable condition.

19. A method according to claim 14 wherein said second mold and blow mold are maintained in integral spaced relationship and are arranged for common reciprocation.

20. A method according to claim 14 wherein said parison is formed by injection molding onto said first core in a parison die.

21. A method according to claim 14 wherein the heat content of the parison is altered by removing heat from the parison by means of heat exchange with said first core and first mold.

* * * * *